(12) United States Patent
Pind (10) Patent No.: US 9,032,237 B2
(45) Date of Patent: May 12, 2015

(54) USING TRAVEL-TIME AS MEANS FOR IMPROVING THE ACCURACY OF SIMPLE NETWORK TIME PROTOCOL

(75) Inventor: Henrik Pind, Västerås (SE)

(73) Assignee: ABB Technology Ltd., Zürich (CH)

( * ) Notice: Subject to any disclaimer, the term of this patent is extended or adjusted under 35 U.S.C. 154(b) by 1294 days.

(21) Appl. No.: 12/086,581

(22) PCT Filed: Dec. 12, 2006

(86) PCT No.: PCT/IB2006/003586
§ 371 (c)(1), (2), (4) Date: Jun. 16, 2008

(87) PCT Pub. No.: WO2007/069041
PCT Pub. Date: Jun. 21, 2007

(65) Prior Publication Data
US 2009/0172455 A1    Jul. 2, 2009

Related U.S. Application Data (60) Provisional application No. 60/750,389, filed on Dec. 15, 2005.

(51) Int. Cl.
*G06F 1/12* (2006.01)
*H04J 3/06* (2006.01)
*H04L 12/26* (2006.01)
(Continued)

(52) U.S. Cl.
CPC ............. *H04J 3/0667* (2013.01); *H04J 3/14* (2013.01); *H04L 12/2602* (2013.01); *H04L 43/00* (2013.01); *H04L 43/106* (2013.01); *H04L 43/16* (2013.01); *Y04S 40/168* (2013.01); *H04L 67/00* (2013.01); *H04L 67/12* (2013.01)

(58) Field of Classification Search
CPC ......................................................... G06F 1/12
USPC ......................................................... 713/400
See application file for complete search history.

(56) References Cited

U.S. PATENT DOCUMENTS

| 5,812,749 | A    | 9/1998 | Fernandez et al. |
| 6,731,600 | B1 * | 5/2004 | Patel et al. ................ 370/230 |
| 6,985,499 | B2 * | 1/2006 | Elliot ........................ 370/503 |

(Continued)

FOREIGN PATENT DOCUMENTS

| CA | 2553935 A1 | 10/2001 |
| CN | 1889392    | 1/2007  |

OTHER PUBLICATIONS

PCT/ISA/210—International Search Report—August 14, 2007.
(Continued)

*Primary Examiner* — Kim Huynh
*Assistant Examiner* — Eric Chang
(74) *Attorney, Agent, or Firm* — Venable LLP; Eric J. Franklin (57) ABSTRACT

A method for improving accuracy of simple network time protocol. A time inquiry is sent from at least one device in a substation to a time provider. A message including a reference time is received from the time provider. An accuracy of the reference time is evaluated. If the accuracy of the reference time is less than a threshold value the accuracy of the reference time is improved. The reference time is utilized for synchronization.

12 Claims, 5 Drawing Sheets

(51) Int. Cl.
*H04L 29/08* (2006.01)
*H04J 3/14* (2006.01)

(56) References Cited

U.S. PATENT DOCUMENTS

| | | | |
|---|---|---|---|
| 7,196,660 B2 * | 3/2007 | Abraham et al. | 342/357.25 |
| 7,702,909 B2 * | 4/2010 | Vainstein | 713/178 |
| 7,774,461 B2 * | 8/2010 | Tanaka et al. | 709/224 |
| 7,796,548 B2 * | 9/2010 | Lee | 370/328 |
| 2004/0125822 A1 | 7/2004 | Jun et al. | |
| 2005/0172232 A1 * | 8/2005 | Wiseman | 715/718 |

OTHER PUBLICATIONS

PCT/ISA/237—Written Opinion of the International Searching Authority—August 14, 2007.

* cited by examiner

USING TRAVEL-TIME AS MEANS FOR IMPROVING THE ACCURACY OF SIMPLE NETWORK TIME PROTOCOL

CROSS-REFERENCE TO RELATED APPLICATIONS

This application claims priority to U.S. provisional patent application 60/750,389 filed 15 Dec. 2005 and is the national phase under 35 U.S.C. §371 of PCT/IB2006/003586 filed 12 Dec. 2006.

FIELD OF THE INVENTION

The present invention relates to a method for improving the accuracy for Simple Network Time Protocol (SNTP) synchronization, used in a protection or monitoring terminal, so that a software solution for SNTP gives good enough synchronization for time-stamping of events and disturbances.

BACKGROUND OF THE INVENTION

Demands on the electrical transmission and distribution system continue to increase. Disturbances in the electrical power grid cause social and economic hardship. As a result, scrutiny on the electrical power grid and its management have increased. Means are continuously being sought to improve management of the electrical power grid. One way to achieve a more reliable power grid is through more accurate identification of events and disturbances.

SNTP is a communication protocol that is widely used in digital communication systems. It is a simplified derivation of Network Time Protocol (NTP), which is an Internet protocol used to synchronize the clocks of computers. Particular versions of SNTP are referred to as Request For Comments (RFC) versions. Some examples of RFC versions of SNTP include RFC 2030, RFC 1769, and RFC 1361.

IEC 61850 is an international standard for substation automation systems which defines communication between devices, such as Intelligent Electronic Devices (IED's), in a substation and related system requirements. IEC-61850-8-1 is part 8-1 (Specific Communication Service Mapping) of the IEC 61850 standard, which specifies utilization of SNTP RFC 2030 for time synchronization of IED's in substations. In a modern electrical substation IEC-61850-8-1 is typically used for communication between IED's both vertically and horizontally. IEC-61850-8-1 uses SNTP for synchronization purposes and a good synchronization in the IED is of utmost importance for event handling and disturbance-handling.

SNTP provides a "Ping-Pong" method of synchronization. Along these lines, a message is typically sent from an IED to a time-provider. The time-provider typically returns the message after filling in a reception time and a transmission time. Typically, SNTP provides a synchronization-level of about 10 ms.

SUMMARY OF THE INVENTION

Further objectives and advantages, as well as the structure and function of exemplary embodiments will become apparent from a consideration of the description, drawings, and examples.

One embodiment of the present invention provides a method for improving accuracy of simple network time protocol. The method includes sending a time inquiry from at least one device in a substation to a time provider. A message including a reference time is received from the time provider. An accuracy of the reference time is evaluated. If the accuracy of the reference time is less than a threshold value the accuracy of the reference time is improved. The reference time is utilized for synchronization of devices in the substation.

Embodiments of the present invention also include a computer program product including a computer readable medium and computer program instructions recorded on the computer readable medium and executable by a processor for carrying out the method.

BRIEF DESCRIPTION OF THE DRAWINGS

The foregoing and other features and advantages of the invention will be apparent from the following, more particular description of an exemplary embodiment of the invention, as illustrated in the accompanying drawings wherein like reference numbers generally indicate identical, functionally similar, and/or structurally similar elements.

DETAILED DESCRIPTION OF EMBODIMENTS OF THE INVENTION

Embodiments of the invention are discussed in detail below. In describing embodiments, specific terminology is employed for the sake of clarity. However, the invention is not intended to be limited to the specific terminology so selected. While specific exemplary embodiments are discussed, it should be understood that this is done for illustration purposes only. A person skilled in the relevant art will recognize that other components and configurations can be used without parting from the spirit and scope of the invention.

Figure 1:
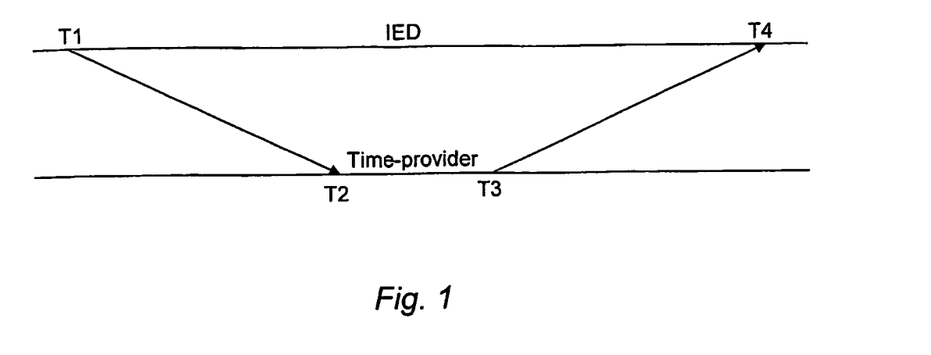
FIG. 1 represents a schematic drawing that illustrates a "ping-pong" method.

FIG. 1 illustrates a ping-pong method for communication between a device and a time provider. In the embodiment shown in FIG. 2, the device is an IED. The time provider is a clock. Examples of such a clock include Meinberg LANTIME/GPS/LNE/ZTC available from Meinberg Funkuhren GmbH & Co. KG of Bad Pyrmont, Germany and OnTime T200, available from Westermo OnTime AS of Oslo, Norway. The clock may be synchronized with the global positioning system (GPS). In the set illustrated in FIG. 2, the IED places a message onto the stack in point A. The message leaves the network card in the IED at point B, reaches the network card in the time-provider at point C, and leaves the stack at point D. On the return path, the messages is pushed onto the stack at point E by the time provider. The messages enter the network at point F, reach the IED at point G and reach the destination, or the SNTP client, at point H.

FIG. 1 illustrates a typical scheme for communication between the IED and the time provider. A time inquiry signal is sent from a device to a time provider at time T1. According to one embodiment, T1 is the time that the device puts the inquiry in a communication data stack, point B in the graph shown in FIG. 2. Utilizing T1 at point B as the best estimation of T1 can minimize time errors caused by the stack, including the network interface card (NIC). However, to obtain time T1 at B means that a high degree of hardware support is needed. This means that the hardware must observe the outgoing messages, find out if there is a time message, find out when the message starts to reach a "drop-link", get the time and change the time T1 in the time message with this new time, and finally recalculate the checksum to correct the message. T1 may also be taken at time A.

The time provider receives the time inquiry signal at time T2. Time T2 may be taken at point C in FIG. 2, as the time that the packet is taken from the stack in the time provider, in the time-scale of the time provider. Time T2 may also be taken at point D in FIG. 2.

At time T3, the time provider sends a message including a reference time signal to the device. According to one embodiment, time T3 is measured at point F in FIG. 2. Time T3 may also be taken at point E in FIG. 2.

The device receives the signal at time T4. Time T4 may be the time that the device receives the packet from the stack, point G in FIG. 2. Time T4 may also be measured at point H in FIG. 2.

Figure 2:
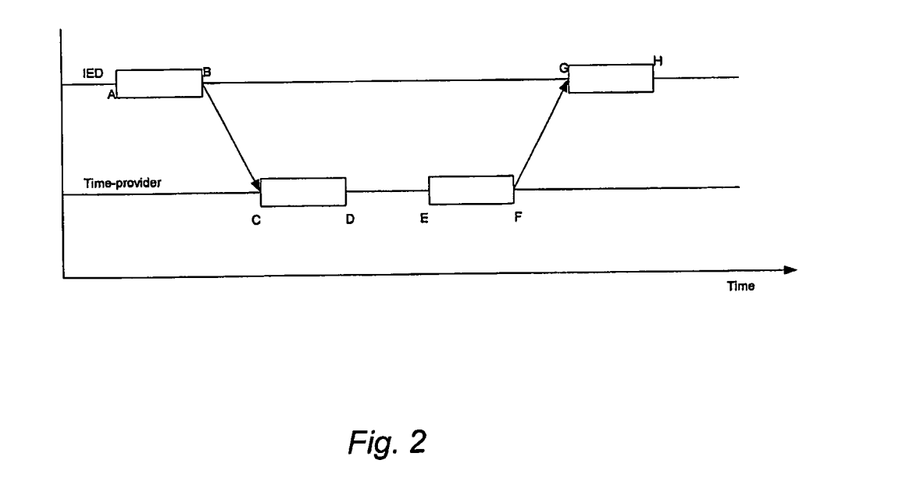
FIG. 2 represents a schematic drawing that illustrates an embodiment of time calculation according to the present invention.

A method utilizing points B, C, F, and G to measure times T1 to T4 can result in an accuracy of the SNTP messages in the range of microseconds. This embodiment requires much hardware support. Utilizing points A, D, E and H to measure times T1 to T4, in other words, measuring time at the stack level, can produce an accuracy of better than 1 ms, independent if the stack implementation and the hardware involved. Typically, in a local network the accuracy is in the range of 100μs.

Current practice includes utilizing the response from the time provider as is. In other words, the quality/accuracy of the reference time sent by the time provider is not questioned. According to the invention, the quality/accuracy of the reference time is evaluated. If the quality/accuracy is not sufficient, the reference time received from the time provider is not used for synchronization. Instead, a corresponding action is performed to improve the quality/accuracy.

The quality/accuracy may be evaluated by comparing the reference time acquired from the time provider with a reference time. The reference time may be calculated based on prior communications between at least one device and the time provider. Based on the communication scheme shown in FIG. 1, the time-difference between a device, such as an IED, and the time-provider may be approximately ((T2−T1)−(T4−T3))/2. This time is typically used to synchronize a device. The travel-time (also called transmission-delay, or network-delay) may be defined as ((T2−T1)+(T4−T3)), and may include the stack time as well as the time spent on the network. If a system includes hardware support, the stack time may be reduced and only the time on the network may be calculated.

A delay in transmission from a device to the time-provider may appear as an increase in the difference (T2−T1). This difference may be reflected both in the time difference and the travel time. Likewise, if there is a delay in the transmission back from the time-provider to the device, this may appear as an increase in the difference (T4−T3).

The present invention can check the travel-time against a preset, or calculated, travel-time-limit. If the travel-time is larger than the travel-time-limit, the present invention may make another SNTP-question instead of using the message for synchronizing the IED.

During normal synchronization, SNTP questions may be periodically transmitted by device(s) and the travel-time may remain quite constant. If the travel-time is larger than usual, the present invention assumes that the difference (T4−T3) or (T2−T1) has been increased, and that the SNTP message should not be utilized for synchronization.

Figure 3:
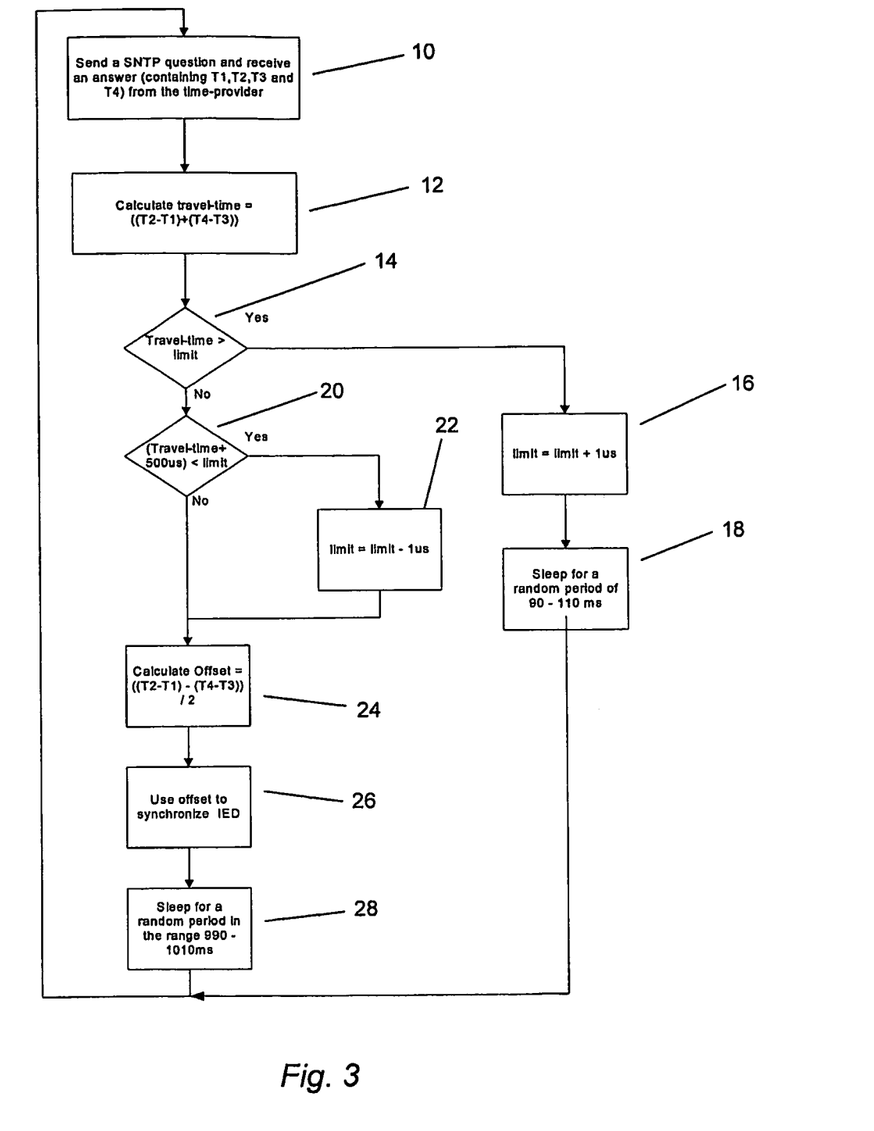
FIG. 3 represents a flow chart that illustrates steps that may be included in an embodiment of the present invention.

The travel-time normally ripples a bit, and the travel-time-limit typically must not be set too low. If it is, the SNTP client appears not to work at all. As an alternative to a fixed travel-time limit, the limit can be calculated from the measured travel-times using a simple algorithm. FIG. 3 represents a flow chart that provides a somewhat simplified illustration steps that may be included in an embodiment of an algorithm for limit calculation according to the present invention. The embodiment illustrated in FIG. 3 begins with the step 10 sending an SNTP question from the IED to a time provider and receiving an answer from the time provider. Travel time is then calculated 12. In this embodiment, time is calculated as ((T2−T1)+(T4−T3)). Next, the travel time is compared to a travel time limit 14. If the travel time is greater than a preset limit, then the limit is increased 16. The amount that the limit is increased may vary. According to this embodiment, the limit is increased by about 1 μs. The system may then be put to sleep 18 for a period of time having a random length. Typically, the length of time that the limit is put to sleep is about 90-110 ms.

If the travel time is not greater than a limit, then the travel time plus an additional length of time is compared to the limit 20. The length of time that is added to the travel time according to this embodiment is about 500 μs. If the increased travel time is less than the limit, then the limit is set to a reduced value 22. In this embodiment, the limit is reduced by about 1 μs.

After increasing the limit and if the increased travel time is not less than the limit, then an offset is calculated 24. The offset may be calculated according to the formula ((T2−T1)−(T4−T3))/2. The offset may then be used to synchronize the IED 26. The system may then be put to sleep 28 for a time period having a random length. For example, the length of the sleep period may be from about 990 to about 1010 μs. At the end of sleep period 18 or 28 the limit calculation may start again with the sending of the SNTP question 10.

The length of time between producing SNTP question may vary. When first calculating the limit, three questions may be generated and sent to the time provider about 100 ms apart, in order to find a good start value for the limit. According to the embodiment shown in FIG. 3, about 1000 ms is used as a "normal" question period. That is, a question is sent every second from the IED to the time-provider. If a fault is detected or if the travel time is too large, according to this embodiment of the algorithm, a new question is asked after about 100 ms. That is, a new question is asked ¹⁄₁₀ of the normal period.

The period of about one second has been proven to not load the network unnecessarily, but yet giving good time accuracy. The time period could be lower, however, the time should not be lowered to a point where the network load would increase unnecessarily. The time period could also be increased. However, the time period should not be so long that drift of the clock to synchronize would be a problem.

Normally, the travel-time on a local network is in the range of about 3 to about 4 ms.

If the quality is determined to have deteriorated, the present invention can take action to improve the quality. According to one embodiment, the quality is improved by asking the time provider again for a reference time. The same steps described above may be carried out, including sending a time inquiry signal from a device to a time provider, receiving the inquiry signal with the time provider, sending the reference time from the time provider to the device, and receiving the reference time with the device. Making another inquiry for the reference time assumes that the deterioration in the accuracy of the reference time is usually only temporary due to short-time communication problems. In particular, especially high traffic can increase travel times. The repetition of the steps may be carried out until a reference time signal of sufficient quality is received by the device(s).

After a reference time of suitable quality/accuracy is provided, the reference time may be utilized to synchronize devices, such as IED's, in a substation and/or among substations. The synchronized time may then be utilized to time stamp events and/or disturbances. Improving the quality/accuracy of the time signal can greatly increase the accuracy of SNTP synchronization among devices, such as IED's, in a substation and/or among substations. The accuracy can be increased such that there is less than about 10 ms difference among the devices. The present invention can actually permit the accuracy to be less than about 1 ms. The load of the time-provider may be increased as well due to an increased number of reference time inquiries, but that increase should be manageable.

Figure 4:
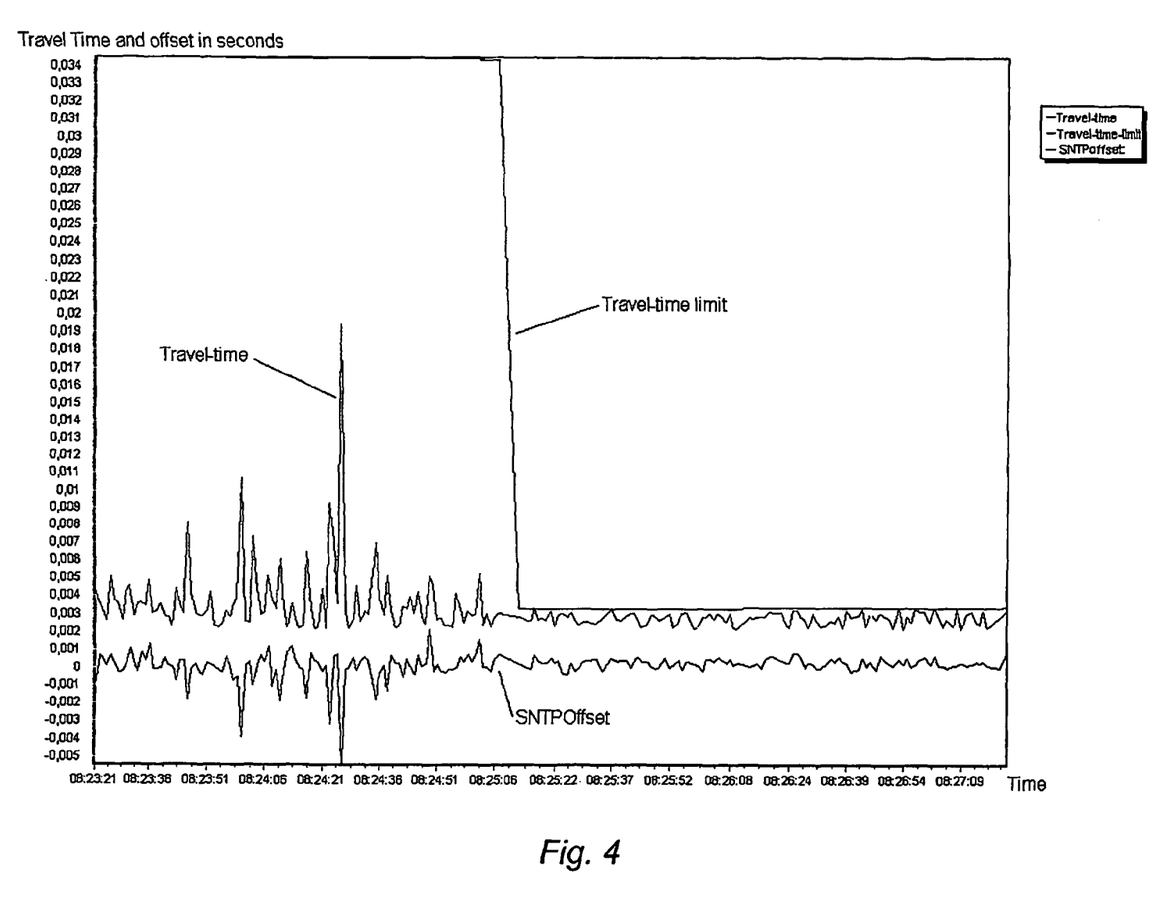
FIG. 4 represents a graph that illustrates travel-time, travel-time limit and synchronization offset as a function of real time.

FIG. 4 provides a graph that illustrates a relationship between travel-time, travel-time-limit and synchronization offset in seconds as function of real time. In FIG. 4, from 8:23 to 8:25 the travel-time-limit is high enough not to have an influence on the behavior. From 8:25 to 8:27, the travel-time-limit is lowered to just above the normal travel-time, and the SNTP-questions, which results in a too large travel-time, are skipped, and followed by a new SNTP-question 100 ms later.

In FIG. 4, all the large travel-times (from 8:23 to 8:25) have a corresponding large offset in the synchronization message (labeled SNTPoffset). As the travel-times from 8:25 to 8:27 are kept below the travel-time-limit, the corresponding SNTP-offsets are kept at an acceptable level. The left-hand side of FIG. 4 illustrates that before the travel-time limit was decreased deterioration in the accuracy of the reference time is usually only temporary due to short-time communication problems.

The method with travel-time measurement for time synchronization may be utilized in applications with current line differential protections in current products, which have specialized hardware support. The present invention is particularly useful with SNTP RFC 2030, RFC 1769, and RFC 1361. The present invention may utilize the travel-time to improve accuracy using the SNTP protocol over standard switched Ethernet.

Figure 5:
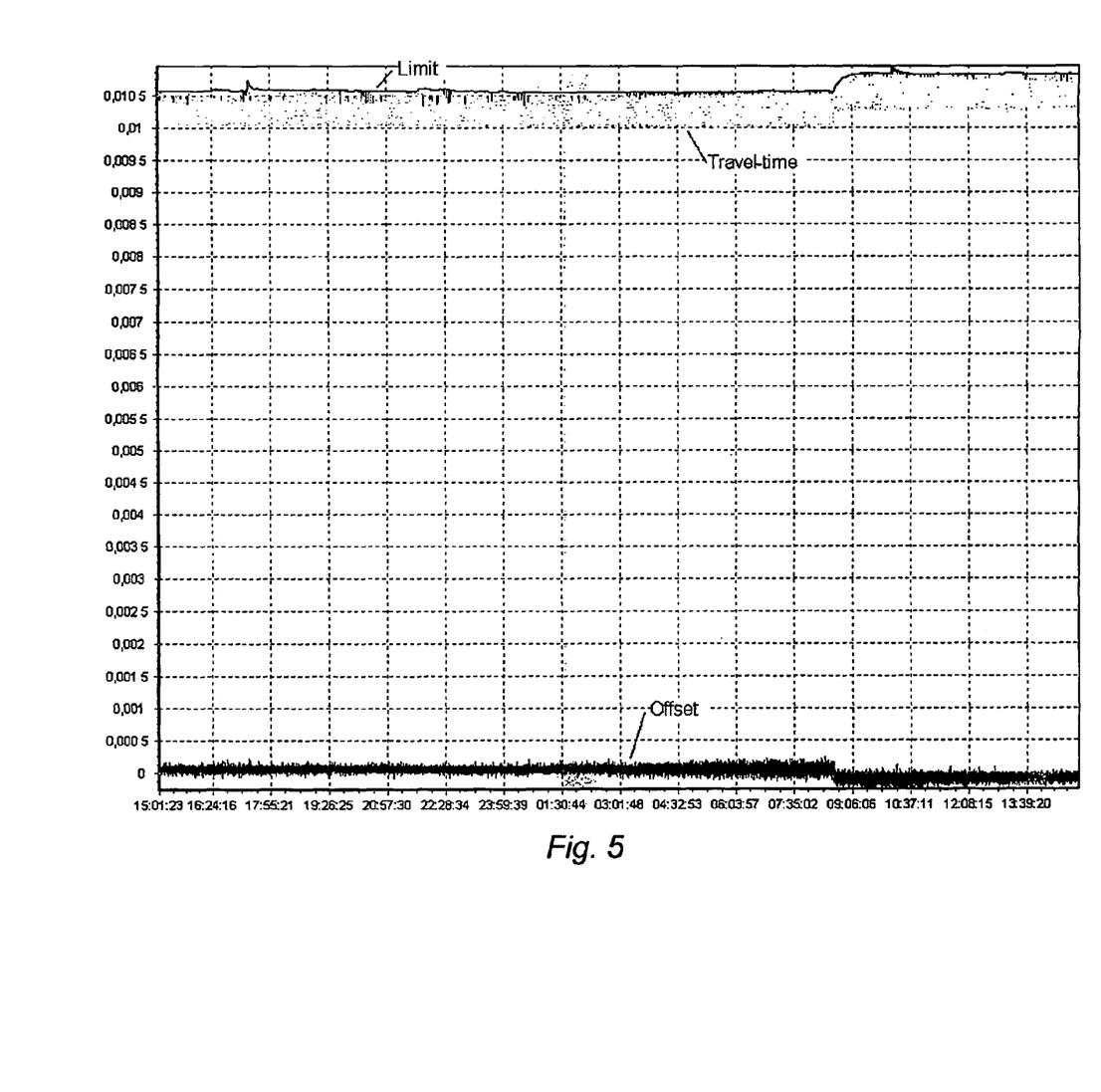
FIG. 5 represents a graph that illustrates a relationship between travel time, travel time limit and an offset of SNTP messages compared to a GPS synchronized clock.

FIG. 5 illustrates the results of a test of the present invention on a global network, proving an accuracy of better than 1 ms accuracy even during route shifts. Along these lines, the graph shown in FIG. 5 illustrates travel-time, travel-time-limit and an offset of SNTP messages compared to a GPS-synchronized clock. The time-scale on the horizontal axis is 24 hours, and on the vertical axis is times and offsets in seconds.

As can be seen in FIG. 5, the travel-time is in the range 10 ms, but at about 8:55, there is a drastic change in the travel-time, and the travel-time-limit has to follow. The offset is well below 1 ms (or 0.001 s) for the complete 24 hours, including the travel time change. As shown in FIG. 5, at the beginning of the test, there are eleven points on the route before 8:55 AM. At 8:88 AM, there was a route shift, with twelve points after 8:55.

The present invention also provides a computer program product that includes a computer readable medium. Computer program instructions executable by a processor are recorded on the computer readable medium. The computer program instructions can be utilized to carry out any of the portions of the method described herein.

Figure 6:
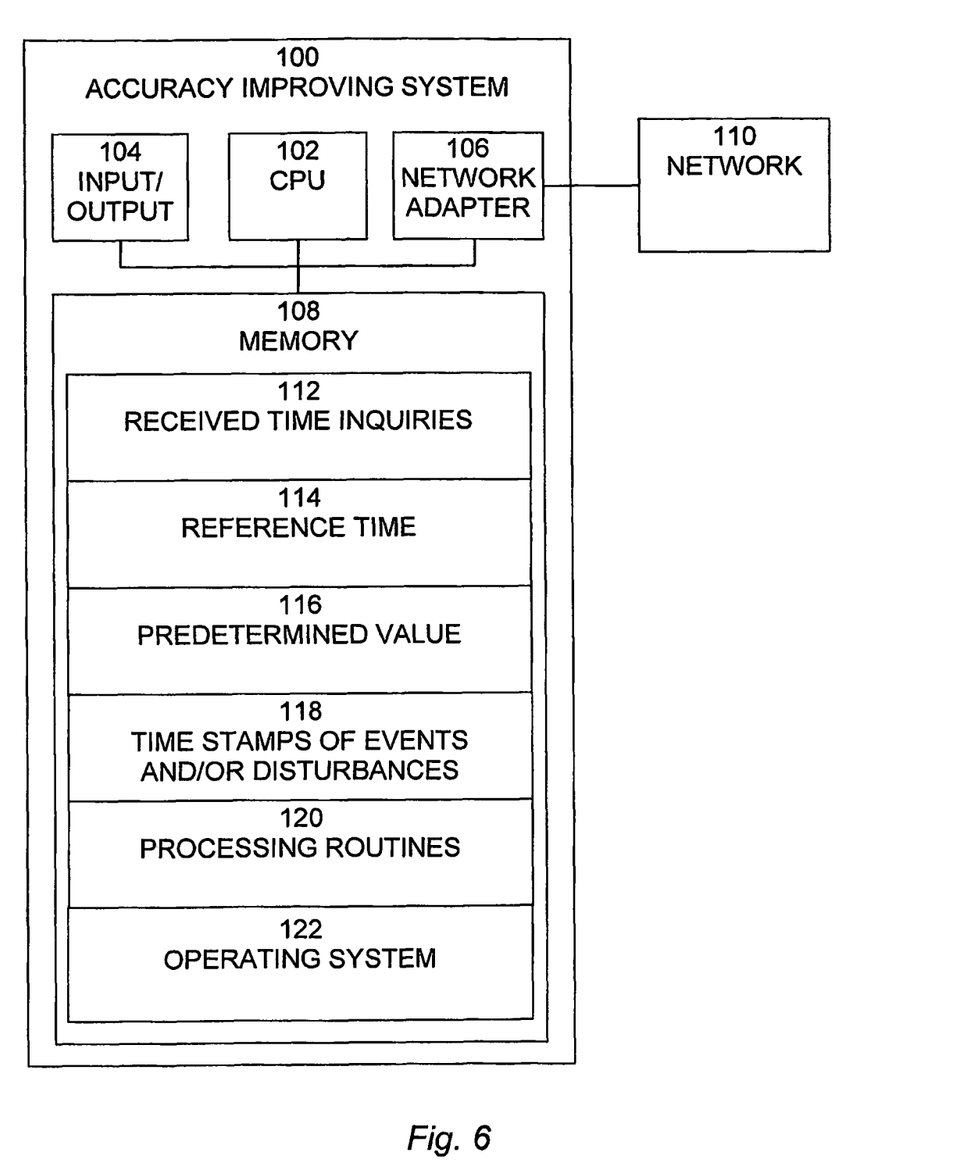
FIG. 6 represents a block diagram of a system according to the present invention.

The present invention also includes a system for performing a process for improving accuracy of simple network time protocol. FIG. 6 illustrates an exemplary block diagram of an accuracy improving system 100, according to the present invention. Accuracy improving system 100 is typically a programmed IED. Accuracy improving system 100 includes processor (CPU) 102, input/output circuitry 104, network adapter 106, and memory 108. CPU 102 executes program instructions in order to carry out the functions of the present invention. Input/output circuitry 104 provides the capability to input data to, or output data from, computer system 100. For example, input/output circuitry may include input devices, such as keyboards, mice, touchpads, trackballs, scanners, etc., output devices, such as video adapters, monitors, printers, etc., and input/output devices, such as, modems, etc. Network adapter 106 interfaces accuracy improving system 100 with network 110. Network 110 may be any standard local area network (LAN) or wide area network (WAN), such as Ethernet, Token Ring, the Internet, or a private or proprietary LAN/WAN.

Memory 108 stores program instructions that are executed by, and data that are used and processed by, CPU 102 to perform the functions of the present invention. Memory 108 may include electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

Memory 108 includes a plurality of blocks of data, such as received time inquiry block 112, reference time block 114, predetermined value block 116, time stamping block 118 and a plurality of blocks of program instructions, such as processing routines 120 and operating system 122. Time inquiry block 112 stores a plurality of time inquiries that have been received by accuracy improving system 100. Reference time block 114 stores a plurality of reference times produced by the time provider. Predetermined value block 116 stores a plurality of predetermined values that may be used to calculate or evaluate the reference time produced by the time provider. Time stamping block can store times of occurrences of events and/or disturbances. Processing routines 120 are software routines that implement the processing performed by the present invention. Operating system 122 provides overall system functionality.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as floppy disc, a hard disk drive, RAM, and CD-ROMs, as well as transmission-type media, such as digital and analog communications links.

The embodiments illustrated and discussed in this specification are intended only to teach those skilled in the art the best way known to the inventors to make and use the invention. Nothing in this specification should be considered as limiting the scope of the present invention. All examples presented are representative and non-limiting. The above-described embodiments of the invention may be modified or varied, without departing from the invention, as appreciated by those skilled in the art in light of the above teachings. It is therefore to be understood that, within the scope of the claims and their equivalents, the invention may be practiced otherwise than as specifically described.

What is claimed is:

1. A computer program product, comprising:
a non-transitory computer readable medium; and
computer program instructions recorded on the computer readable medium and executable by a processor for carrying out a method comprising
sending a time inquiry from at least one device in a substation to a time provider;
receiving a message including a reference time from the time provider;
evaluating an accuracy of the reference time by comparing the reference time with calculations based on prior communications between the at least one device and the time provider;
improving accuracy of simple network time protocol, whereby if the accuracy of the reference time is less than a threshold value improving the accuracy of the reference time by sending a second time inquiry from the at least one device in the substation to the time provider, wherein a second message including a second reference time from the time provider is received, the accuracy of the second reference time, if evaluating the accuracy of the second reference time is less than a threshold value improving the accuracy of the second reference time, and utilizing the second reference time for synchronization; and
utilizing the reference time for synchronization of the at least one device in the substation,
wherein if the accuracy of the reference time is greater than a threshold value, the method further comprises:
determining if the accuracy of the reference time is less than an increased threshold value and increasing the threshold value of the accuracy is within the increased threshold value;
calculating an offset value based on time values;
utilizing the offset to synchronize the at least one device; and
putting the at least one device to sleep for a period of time.

2. A system for performing a process for improving accuracy of simple network time protocol, the system comprising:
a processor operable to execute computer program instructions; and
a memory operable to store computer program instructions executable by the processor, for performing the steps of:
sending a time inquiry from at least one device in a substation to a time provider;
receiving a message including a reference time from the time provider;
evaluating an accuracy of the reference time by comparing the reference time with calculations based on prior communications between the at least one device and the time provider;
improving accuracy of simple network time protocol, whereby if the accuracy of the reference time is less than a threshold value improving the accuracy of the reference time by sending a second time inquiry from the at least one device in the substation to the time provider, wherein a second message including a second reference time from the time provider is received, the accuracy of the second reference time, if evaluating the accuracy of the second reference time is less than a threshold value improving the accuracy of the second reference time, and utilizing the second reference time for synchronization; and
utilizing the reference time for synchronization of the at least one device in the substation,
wherein if the accuracy of the reference time is greater than a threshold value, the method further comprises:
determining if the accuracy of the reference time is less than an increased threshold value and increasing the threshold value of the accuracy is within the increased threshold value;
calculating an offset value based on time values;
utilizing the offset to synchronize the at least one device; and
putting the at least one device to sleep for a period of time.

3. A method for improving accuracy of simple network time protocol, comprising:
sending a time inquiry from at least one device in a substation to a time provider;
receiving a message including a reference time from the time provider;
evaluating an accuracy of the reference time by comparing the reference time with calculations based on prior communications between the at least one device and the time provider;
if the accuracy of the reference time is less than a threshold value improving the accuracy of the reference time by sending a second time inquiry from the at least one device in the substation to the time provider, wherein a second message including a second reference time from the time provider is received, the accuracy of the second reference time, if evaluating the accuracy of the second reference time is less than a threshold value improving the accuracy of the second reference time, and utilizing the second reference time for synchronization; and
utilizing the reference time for synchronization of the at least one device in the substation
wherein if the accuracy of the reference time is greater than a threshold value, the method further comprises:
determining if the accuracy of the reference time is less than an increased threshold value and increasing the threshold value of the accuracy is within the increased threshold value;
calculating an offset value based on time values;
utilizing the offset to synchronize the at least one device; and
putting the at least one device to sleep for a period of time.

4. The method according to claim 3, wherein the time inquiry is sent from an intelligent electronic device.

5. The method according to claim 4, wherein evaluating the accuracy of the reference time comprises comparing a travel time of the message including the reference time with a predetermined value, the method further comprising:
generating a packet including the time inquiry;
putting the packet onto a stack in a time provider in the intelligent electronic device (T1);
taking the packet from the stack in the time-provider (T2);
putting the packet onto the stack in the time-provider (T3); and receiving the packet from the stack in the intelligent electronic device (T4), wherein the travel time is computed according to the formula (T2−T1)+(T4−T3).

6. The method according to claim 3, further comprising: time stamping at least one of events or disturbances utilizing the reference time.

7. The method according to claim 3, the devices are synchronized to within about 10 ms.

8. The method according to claim 3, wherein evaluating the accuracy of the reference time comprises comparing a travel time of the message including the reference time with a calculated value.

9. The method according to claim 3, wherein the devices are synchronized to within about 1 ms.

10. A method for improving accuracy of simple network time protocol, comprising:
sending a time inquiry from at least one device in a substation to a time provider;
receiving a message including a reference time from the time provider;
evaluating an accuracy of the reference time by comparing the reference time with calculations based on prior communications between the at least one device and the time provider;
if the accuracy of the reference time is less than a threshold value improving the accuracy of the reference time by sending a second time inquiry from the at least one device in the substation to the time provider, wherein a second message including a second reference time from the time provider is received, the accuracy of the second reference time, if evaluating the accuracy of the second reference time is less than a threshold value improving the accuracy of the second reference time, and utilizing the second reference time for synchronization; and
utilizing the reference time for synchronization of the at least one device in the substation
wherein if the accuracy of the reference time is less than a threshold value, the method further comprises:
decreasing the threshold value and putting the at least one device to sleep prior to sending a second time inquiry from the at least one device in the substation to the time provider, wherein a second message including a second reference time from the time provider is received, the accuracy of the second reference time, if evaluating the accuracy of the second reference time is less than a threshold value improving the accuracy of the second reference time, and utilizing the second reference time for synchronization.

11. A computer program product, comprising:
a non-transitory computer readable medium; and
computer program instructions recorded on the computer readable medium and executable by a processor for carrying out a method comprising
sending a time inquiry from at least one device in a substation to a time provider;
receiving a message including a reference time from the time provider;
evaluating an accuracy of the reference time by comparing the reference time with calculations based on prior communications between the at least one device and the time provider;
improving accuracy of simple network time protocol, whereby if the accuracy of the reference time is less than a threshold value improving the accuracy of the reference time by sending a second time inquiry from the at least one device in the substation to the time provider, wherein a second message including a second reference time from the time provider is received, the accuracy of the second reference time, if evaluating the accuracy of the second reference time is less than a threshold value improving the accuracy of the second reference time, and utilizing the second reference time for synchronization; and
utilizing the reference time for synchronization of the at least one device in the substation,
wherein if the accuracy of the reference time is less than a threshold value, the method further comprises:
decreasing the threshold value and putting the at least one device to sleep prior to sending a second time inquiry from the at least one device in the substation to the time provider, wherein a second message including a second reference time from the time provider is received, the accuracy of the second reference time, if evaluating the accuracy of the second reference time is less than a threshold value improving the accuracy of the second reference time, and utilizing the second reference time for synchronization.

12. A system for performing a process for improving accuracy of simple network time protocol, the system comprising:
a processor operable to execute computer program instructions; and
a memory operable to store computer program instructions executable by the processor, for performing the steps of:
sending a time inquiry from at least one device in a substation to a time provider;
receiving a message including a reference time from the time provider;
evaluating an accuracy of the reference time by comparing the reference time with calculations based on prior communications between the at least one device and the time provider;
improving accuracy of simple network time protocol, whereby if the accuracy of the reference time is less than a threshold value improving the accuracy of the reference time by sending a second time inquiry from the at least one device in the substation to the time provider, wherein a second message including a second reference time from the time provider is received, the accuracy of the second reference time, if evaluating the accuracy of the second reference time is less than a threshold value improving the accuracy of the second reference time, and utilizing the second reference time for synchronization; and
utilizing the reference time for synchronization of the at least one device in the substation,
wherein if the accuracy of the reference time is less than a threshold value, the method further comprises:
decreasing the threshold value and putting the at least one device to sleep prior to sending a second time inquiry from the at least one device in the substation to the time provider, wherein a second message including a second reference time from the time provider is received, the accuracy of the second reference time, if evaluating the accuracy of the second reference time is less than a threshold value improving the accuracy of the second reference time, and utilizing the second reference time for synchronization.

* * * * *